United States Patent [19]
Happy

[11] Patent Number: 5,935,704
[45] Date of Patent: Aug. 10, 1999

[54] INCREMENTAL FILAMENT WOUND POLE

[76] Inventor: Henry Happy, P.O. Box 68, Jacksonville, Fla. 32219

[21] Appl. No.: 08/923,012

[22] Filed: Sep. 3, 1997

[51] Int. Cl.[6] ..................................................... D02G 3/00
[52] U.S. Cl. ......................... 428/361; 428/360; 428/364; 428/377; 428/398; 264/134; 264/135; 264/136; 264/257; 264/258; 264/266; 156/446; 156/196; 156/184; 156/173
[58] Field of Search ........................... 242/7.02; 156/169, 156/172, 173, 175, 196, 425, 309.6, 161, 184, 162, 195, 446, 74, 309.9; 264/134, 135, 136, 137, 257, 258, 266; 428/364, 375, 376, 377, 398, 399, 401, 360, 361

[56] References Cited

U.S. PATENT DOCUMENTS

| | | | |
|---|---|---|---|
| 4,067,362 | 1/1978 | Jackman | 138/173 |
| 4,391,594 | 7/1983 | Hannibal et al. | 464/80 |
| 4,529,139 | 7/1985 | Smith et al. | 242/7.02 |
| 5,116,071 | 5/1992 | Calfee | 280/281.1 |
| 5,158,733 | 10/1992 | Trimble | 264/258 |
| 5,221,391 | 6/1993 | Kittaka et al. | 156/171 |

*Primary Examiner*—Merrick Dixon
*Attorney, Agent, or Firm*—Thomas C. Saitta

[57] ABSTRACT

Continuous, filament reinforced, wound poles, and the method of making, where the poles are formed by winding a base mandrel with continuous, resin-impregnated filament reinforcement, coaxially abutting an incremental mandrel and winding both the incremental mandrel and the wound first mandrel with a second layer of continuous, resin-impregnated filament reinforcement. The base mandrel is thus wound with two layers of reinforcement. Additional incremental mandrels and additional layers of continuous, resin-impregnated filament reinforcement are successively wound as desired. Preferably all windings occurs prior to the curing of any previous winding. The ends of the mandrels and any cross winding across these ends form stabilizing members within the poles to counteract against compressive forces. The pole has a smooth outer surface when the additional mandrels are properly sized to mate with the wound ends of the previous adjacent mandrel.

11 Claims, 2 Drawing Sheets

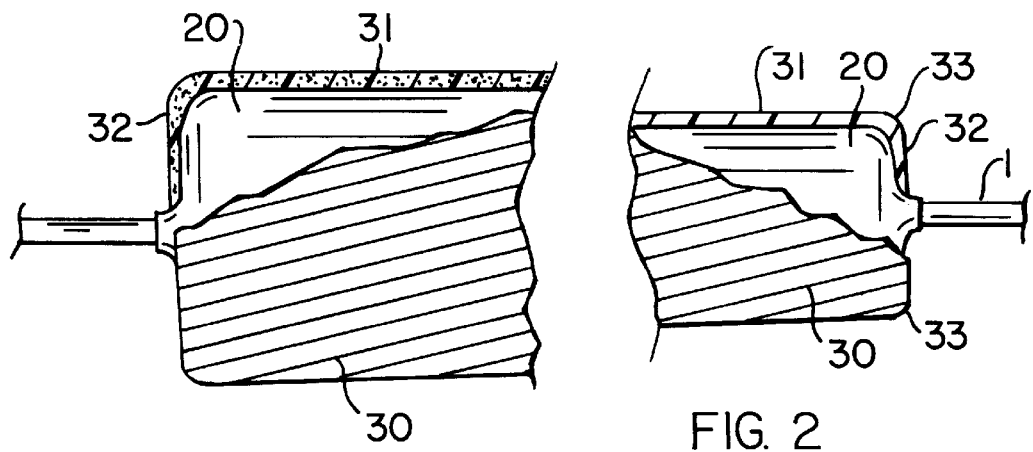
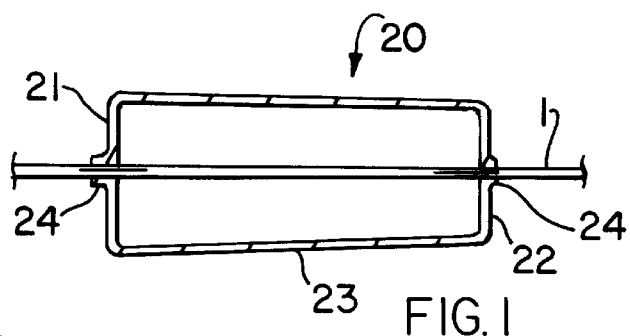
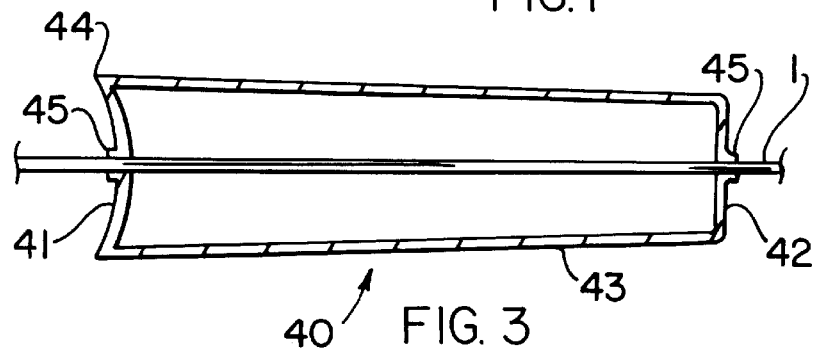

INCREMENTAL FILAMENT WOUND POLE

BACKGROUND OF THE INVENTION

This invention relates generally to the field of filament wound objects, and more particularly to such objects which are elongated, relatively thin in cross-section and tapering, and are used primarily to support objects a distance above the ground, such as for example utility poles used to support lines or lights. Even more particularly, the invention relates to such objects which are composed of incremental or segmental portions which are co-axially aligned, where a first mandrel is filament wound, a second mandrel is aligned with and abutted against the first and both mandrels are filament wound, then successive mandrels are added as desired, such that an object with non-uniform wall thickness is produced, and where the entire process is completed before any of the individual windings cure so that the object cures as a unitary member with no weaker secondary bonds.

Filament winding is a reinforced plastic process employing a series of continuous resin impregnated fibers applied to a rotating mandrel in a predetermined geometrical pattern under controlled tension, which then cures to form a body with a high strength-to-weight ratio, good corrosion, thermal and impact resistance, and a high strength-to-thickness ratio. The filaments may be composed of fiberglass, graphite, aramid or the like. Suitable resins include epoxies, polyesters, polyimides, silicones and phenolics. Mandrels may be made of cardboard, wood, plastic or metal, and may in some instances be removed from the filament wound object after curing or left in place.

Cylindrical objects such as fiberglass reinforced plastic pipe and tanks have been made by the filament winding process for years. Equipment for this process resembles the conventional machine shop lathe. The mold or mandrel is positioned between the headstock and tailstock and is rotated so that continuous reinforcement, saturated with plastic binding material, may be pulled onto the surface. The carriage which dispenses the reinforcement moves in a direction parallel to the longitudinal axis of the mandrel. The linear speed of the carriage is synchronized with the surface speed of the mandrel so that the reinforcement is applied at some predetermined and controlled position and orientation. The carriage traverses back and forth for whatever length of travel is required to build the length of the part. The number of circuits of carriage travel and rotations of the mandrel establish the amount of material deposited onto the mandrel and thereby the thickness of the part.

The synchronization of carriage speed to mandrel surface speed establishes the angle at which reinforcement is applied and thereby the properties of the part being constructed on the mandrel. If carriage speed is fairly slow when compared to mandrel rotation, then reinforcement is applied more near the circumferential direction. This type of filament winding is commonly referred to as hoop winding. If carriage speed is fast compared to mandrel rotation, then reinforcement is applied more near the axial direction. This type of filament winding is commonly referred to as polar, longitudinal or axial winding. Winding at intermediate speed ratios between these two extremes will apply the reinforcement in helical patterns on the mandrel surface and is called helical winding. Helical winding closer to the axial direction is called low angle while helical winding closer to the circumferential direction is called high angle.

The choice and distribution of winding direction and thickness controls the tensile, flexural, compressive, elastic, rigidity, bearing and other mechanical properties of the finished product. Hoop winding is the easiest fabrication method and provides maximum circumferential strength. Polar winding provides maximum strength parallel to the cylinder axis but presents two problems not encountered in hoop winding. First, the reinforcement must be held onto the mandrel when carriage travel is reversed at the end of the carriage stroke. This may be accomplished by winding over the ends of the mandrel so that the reinforcement is mechanically held and prevented from sliding toward the mandrel center. Another method is to stop the carriage at the end of the stroke and allow the reinforcement to wind onto the mandrel in the hoop direction to effectively tie itself onto the mandrel. This carriage operation is referred to as dwell. One of more revolutions of the mandrel may be required in the dwell position to fix the reinforcement and a substantial build-up of material may occur. The second problem encountered in polar winding involves sagging of the reinforcement away from the mandrel. This is particularly troublesome with polar winding of long objects.

Helical winding provides the designer with a method to establish and control properties in the circumferential and axial directions by applying reinforcements at some angle in between the hoop and polar directions. The weakness in this process occurs at the ends of the mandrel where the direction of carriage travel is reversed. Sliding of reinforcement may occur and is usually overcome by the same means as in polar winding.

Filament wound poles which have a slight taper are known and are used in many applications where a load is to be supported a distance above the ground. A typical example is a utility pole, which can be up to 35 feet or more in length. Tensile properties are to be maximized in this type of object, meaning that polar winding would be generally preferred as it places the high strength reinforcement in the most useful direction. But because the pole is generally vertically oriented, consideration must be given to the compressive strength at the base, meaning that the wall must be of sufficient thickness at and near the base end of the pole to support the remainder of the pole itself and the load carried by the pole. Horizontal loads applied by wind and wires cause deflection and stresses that are primarily axial in direction. The stresses are tensile on one side and compressive on the other. Failure of a pole generally occurs because the compressive strength of the thin wall is exceeded, resulting in a buckling of the pole. If the pole is only polar wound, then achieving the required base thickness will result in excessive thickness in the upper part of the pole, with excessive overall weight and material waste. If the pole is polar wound only to the thickness required in the upper portion of the pole, then additional reinforcement material must be added at the base. If only helical winding is used and the wall thickness is varied from the base to the tip of the pole, then winding angle must be progressively increased from the tip to the base, with accompanying loss of axial strength as the winding angle increases. This may require the addition of some additional tensile reinforcement toward the end of the pole to meet structural demand.

Regardless of whether the pole is polar wound or helically wound, the purpose is to most efficiently use the high tensile strength of the reinforcement to satisfy the tensile strength requirement of the pole. However, thin wall cylindrical shapes loaded in this fashion frequently fail by compressive buckling long before the full tensile strength is developed or exceeded. this is particularly true of composite materials with low modulus of elasticity values. To increase resistance to compressive buckling, stiffeners may be spaced at suitable intervals as a part of the product. Known prior art techniques involve either wrapping or applying the stiffening elements externally to the wound pole, which is not aesthetically pleasing, or involve removing the mandrel and inserting bulkhead members into the interior of the pole, which are then fastened adhesively. It is very difficult to obtain a good secondary bond between the interior wall of the pole and the stiffeners in this manner.

It is an object of this invention to provide a filament wound pole, and a novel method for making such as pole, which is filament wound primarily in the polar or low angle helical direction and has a greater wall thickness at the base of the pole than at the tip, the increased thickness being due to the presence of additional layers of filament wound reinforcement. It is a further object to provide such a pole which is wound as one integral piece on multiple mandrels, coaxially aligned in incremental steps to create the total longitudinal length of the pole, where a first mandrel is wound with reinforcement, a second or upper mandrel is coaxially aligned and abutted against the first mandrel, and both mandrels are then filament wound, such that the first mandrel has two layers of reinforcement and the second mandrel has one, with successive upper mandrels and windings applied in like manner to increase the number of reinforcement layers and extend the pole as required. It is a further object to provide such a pole where the mandrels are dimensioned such that the outer diameter of the base end of each mandrel aligned to a previously wound mandrel is approximately equal to the outer diameter of the reinforcement surrounding the previously wound mandrel, such that the surface of the outer layer of added reinforcement applied to both mandrels is smooth at the junction between the added mandrel and the previously wound mandrel. It is a further object to provide such a pole where the incremental winding steps are all successively performed prior to curing of any individual winding, such that the finished pole cures as a single, unitary member with no secondary bonding between components. It is a further object to provide such a pole with integral internal circumferential stiffeners created during the fabrication process at strategic locations to provide resistance to premature compressive buckling failure.

SUMMARY OF THE INVENTION

In general the invention is a filament wound pole and the method for making such a pole. The pole is produced by wrapping continuous resin-impregnated filament reinforcement about a generally elongated first or base mandrel to produce a first filament wound section. A second generally elongated incremental mandrel is then coaxially abutted against the end of the first wound section and the combination of the first wound section and the second mandrel is then wrapped with continuous resin-impregnated filaments to produce a filament wound pole having two layers of filament reinforcement on the first mandrel and one layer of filament reinforcement on the second mandrel. A third, fourth or any number of additional incremental mandrels may be likewise added and wrapped, the resulting pole having sections with different numbers of filament reinforcement layers—with the layers encasing the first mandrel equalling the total number of mandrels, the layers encasing the second mandrel equalling one less than the total number of mandrels, etc. Most preferably, the successive windings are performed prior to the curing of any earlier winding, such that the finished object cures into a unitary member rather than one having a number of individual components joined by secondary bonding. It is also possible to apply multiple layers at any phase of the operation without adding additional mandrels if thicker reinforcement is required. The base mandrel will always have the highest number of layers, while the last added or tip mandrel will have the least.

Preferably, the mandrels taper slightly from the base or proximal end of each mandrel to the tip or distal end of the mandrel. The first mandrel will have generally flat, concave or slightly convex ends to best secure the filament windings across the ends, while each successive mandrel will preferably have a generally concave base end and a generally flat, concave or slightly convex tip end. The outer diameter of the base end of each added mandrel is preferably equal to the outer diameter of the tip end of the filament reinforcement layer of the previous section as wound, and the base end of each added mandrel is configured to correspond, mate or seat against the previous wound section so that there is a smooth transition at the joint between the previous wound section and the added mandrel. This results in a smooth exterior surface at the joint between the mandrels for the successive filament reinforcement layer. The finished pole contains a number of circumferential internal stiffener members to prevent compressive failure, the stiffener members being formed by the mandrel ends and reinforcement laid across the ends.

BRIEF DESCRIPTION OF THE DRAWINGS

FIG. 1 is a cross-sectional view of the base mandrel on the spindle.

FIG. 2 is a view of the base mandrel encased in a layer of wound filament reinforcement, with a portion of the filament wound mandrel shown as exposed and a portion of the filament wound reinforcement shown in cross-section.

FIG. 3 is a cross-sectional view of an incremental mandrel on the spindle.

DETAILED DESCRIPTION OF THE INVENTION

Figure 5:
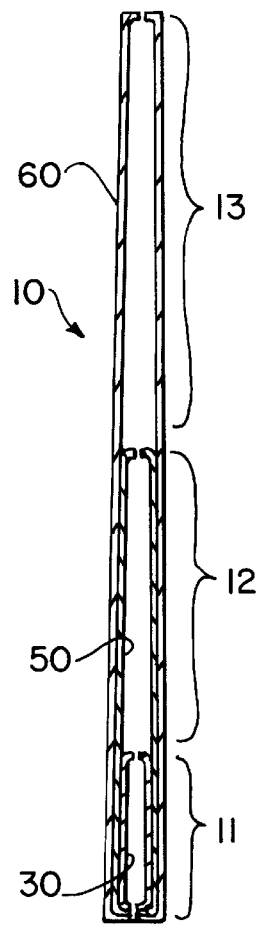
FIG. 5 is a cross-sectional view of a pole formed on three total mandrels showing the positioning of the filament reinforcement layers, with the mandrels not shown for clarity.

With reference to the drawings, the invention will now be described in detail with regard for the best mode and the preferred embodiment. In general, the invention comprises a method for manufacturing a pole or similar object composed of layers of continuous resin-impregnated filament reinforcement applied onto a plural number of mandrels, commonly referred to as filament winding, where the pole is formed in incremental steps. The invention further comprises the pole or similar object so formed.

As shown in FIG. 1, a base or proximal mandrel 20 is connected to a rotatable spindle 1 in known manner, the spindle 1 being part of a filament winding apparatus (not shown) of any type known in the art suitable for applying layers of continuous resin-impregnated filament reinforcement onto the mandrel 20 in the polar or helical direction, as explained above. The mandrel 20 is generally elongated and preferably circular in cross-section, although different cross-sectional shapes may also be used. The base mandrel 20 comprises a cylindrical wall 23 joining a base or proximal end 21 and a tip or distal end 22. A neck member 24 encircles the spindle 1 at each end 21 and 22. For construction of a typical utility pole 10 or the like, the mandrel 10 preferably tapers from the base end 21 to the tip end 22, such that the largest diameter is found at the base end 21 and the smallest diameter is found at the tip end 22. Alternatively, cylindrical non-tapering poles, poles of increasing diameters or poles of varying diameters may also be constructed using the methodology. The base mandrel 20 becomes the bottom section when the pole 10 is positioned upright after manufacture. The base end 21 and the tip end 22 may be flat, concave or slightly convex. The base mandrel 20, as well as all additional mandrels, may be solid or hollow, and may be constructed of any of the suitable known materials for such objects.

The base mandrel 20 is filament wound, preferably in the polar or low angle helical direction, with a first layer of continuous resin-impregnated filament reinforcement material 30, as shown in FIG. 2. First layer 30 is defined to be the layer formed by filament winding the base mandrel 20, and may represent a single layer or multiple layers applied to the base mandrel 20. The first layer 30 passes over the base end 21 and the tip end 22 of the base mandrel 20 to secure the reinforcement in place, creating a mandrel 20 encased in a tubular wall 31 and a pair of end walls 32, the filaments of the end walls 32 lying generally in a plane perpendicular to the axis of the spindle 1. Upon curing, the mandrel base end 21, mandrel tip end 22 and end walls 32 form internal stiffeners which greatly increase the structural integrity of the finished pole 10 by acting against compressive failure.

An incremental or second mandrel 40 as shown in FIG. 3 is now inserted onto the spindle 1 in alignment with the base mandrel 20. The incremental mandrel comprises a cylindrical wall 43, preferably circular in cross-section but which can be any of a number of shapes, connecting a base or proximal end 41 and a tip or distal end 42. Neck members 45 extend from the base end 41 and the tip end 42 to encircle the spindle 1. The incremental mandrel 40 preferably tapers in the direction from the base end 41 to the tip end 42, but as with the base mandrel 20 can also have other configurations, such that the base end 41 is the same or smaller in diameter than the tip end 42. The incremental mandrel 40 may be solid or hollow, and may be formed of any suitable material known in the art.

Figure 4:
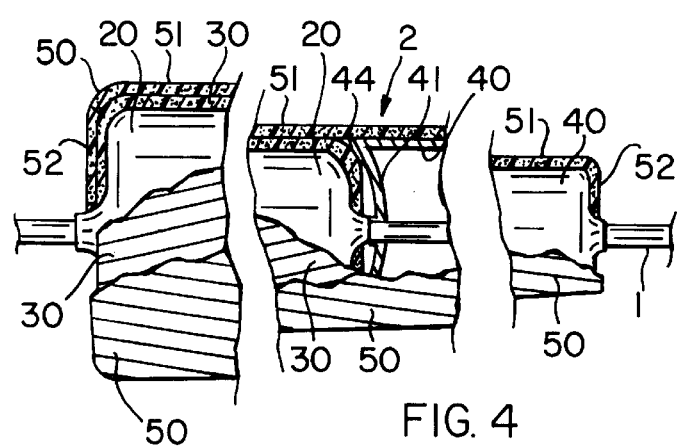
FIG. 4 is a view of an incremental filament wound pole showing a base mandrel encased in two layers of filament reinforcement and an abutted incremental mandrel encased in a single layer of filament reinforcement, with a portion of each layer, the base mandrel and the tip end of the incremental mandrel exposed, with part of the filament reinforcement and base end of the incremental mandrel shown in cross-section.

The tip end 42 may be flat or slightly convex, but the base end 41 of the incremental mandrel 40 is configured to correspond or mate with the filament wound tip end 22 of the base mandrel 20, as seen in FIG. 4. Preferably, the base end 41 is concave with an annular rim or shoulder 44, such that the base end 41 of incremental mandrel 40 abuts tightly against the annular shoulder 33 of the filament reinforcement layer 30 on the tip end 22 of the base mandrel 20 to create a smooth, continuous joint 2 between the two mandrels 20 and 40 with very little or no separation. To accomplish this, the outer diameter of the annular shoulder 44 of base end 41 is sized to equal the outer diameter of the filament wound shoulder 33, meaning that the diameter of the base end 41 of the incremental mandrel 40 is larger than the diameter of the tip end 22 of the base mandrel 20 by an amount equal to the thickness of the reinforcement layer 30 first applied to base mandrel 20.

The combined assembly of filament wound base mandrel 20 and incremental mandrel 40 is then filament wound in known manner to create a second or incremental layer 50 of continuous to resin-impregnated filament reinforcement, having a tubular wall 51 joining end walls 52 and encasing the incremental mandrel 40, the first reinforcement layer 30 and the base mandrel 20. The second layer 50 may also be comprised of either a single layer of reinforcing material or multiple layers. The base end 21 and wall 23 of the base mandrel 20 is now encased in both the first layer 30 and the second layer 50 of filament reinforcement. The incremental mandrel 40 and the tip end 42 are now encased in only the second layer 50. At the joint 2 between the two mandrels 20 and 40, the end wall 32 at the tip end 22 forms an internal stiffener within the pole 10, and the outer surface of the second layer 50 is smooth since the annular shoulder 44 of the base end 41 of the incremental mandrel 40 matches the wound shoulder 33 of the first reinforcement layer 30. Most preferably, the second layer 50 is applied prior to curing of the first layer 30, such that when cured the object is a unitary member with no secondary bonds between components of the type which would occur if the first layer 30 is first allowed to cure prior to application of the second layer 50.

In like manner third, fourth, fifth or any number of additional incremental mandrels 40 may be applied to the spindle 1 and the winding operation repeated each time. In each case the added incremental mandrel 40 is abutted against the distal end of the last applied filament reinforcement layer, with the incremental mandrel 40 sized to properly mate with previous distal end to create a seamless and smooth joint. At each joint, the end wall of the previous filament winding creates internal stiffeners disposed generally radially across the pole axis. For example, as shown in FIG. 5, a pole 10 may be created using three mandrels (not shown for clarity) of differing lengths. The pole 10 is comprised of a first section 11 containing the base mandrel 20 encased in the first reinforcement layer 30, the lower portion of the second reinforcement layer 50, and the lower portion of the third reinforcement layer 60. The second section 12 of pole 10 comprises the second mandrel 40, the remaining portion of the second reinforcement layer 50, and the middle portion of the third reinforcement layer 60. The third section 13 of the pole 10 comprises the third mandrel 40 and the remaining portion of the third reinforcement layer 60. Because the mandrels 20 and 40 are sized to create continuous, smooth joints 2, the outer surface of the third layer 60, which covers the entire pole 10, is smooth. Structurally, the pole 10 has three layers of reinforcement in the first or base section 11 where it is most needed, two layers of reinforcement in the second section 12, and one layer of reinforcement in the third or top section 13 where it is least needed.

Thus for any pole 10 having X number of total mandrels 20 and 40, the base mandrel 20 will be encased in X number of layers of continuous resin-impregnated filament reinforcement, the first incremental mandrel 40 will be encased in X-1 layers, the next incremental mandrel 40 will be encased in X-2 layers, and so forth, until the last incremental mandrel 40 which is encased in only one layer.

Because the pole 10 tapers, it is to be understood that the circumferential area at a lower part of the pole 10 will be greater than at an upper part, such that a single layer of reinforcement may not completely cover the full circumference of the larger part. This factor is taken into consideration in the engineering of the part, and complete coverage of a particular portion of the pole 10 may actually contemplate multiple passes of reinforcement filament to form the single layer as defined herein.

It is contemplated that equivalents and substitutions may be obvious for certain elements set out above to those skilled in the art. The true scope and definition of the invention therefore is to be as set forth in the following claims.

I claim:

1. A method of forming an elongated filament wound object comprising the steps of:
   (A) providing a base mandrel having a base end and a tip end, and mounting said base mandrel onto a spindle of a filament winding apparatus;
   (B) applying a layer of continuous resin-impregnated filament reinforcement to said base mandrel, said base end and said tip end to create a first layer of filament reinforcement;
   (C) providing a second mandrel having a base end and a tip end, and mounting said second mandrel onto said spindle after application of said layer of continuous resin-impregnated filament reinforcement to said base mandrel such that the base end of said second mandrel abuts said filament wound tip end of said base mandrel; and
   (D) applying a second layer of continuous resin-impregnated filament reinforcement to said second mandrel, said second mandrel tip end and said first layer of filament reinforcement encasing said base end of said base mandrel.

2. The method of claim 1, further comprising the step of sizing the outer diameter of said base end of said second mandrel to approximately equal the outer diameter of the first layer of filament reinforcement at the filament wound tip end of said base mandrel to form a smooth-surfaced joint therebetween after application of said second layer of continuous resin-impregnated filament reinforcement.

3. The method of claim 2, further comprising the step of configuring the base end of said second mandrel to be concave.

4. The method of claim 1, where said second layer of continuous resin-impregnated filament reinforcement is applied prior to the curing of said layer of continuous resin-impregnated filament reinforcement applied to said base mandrel.

5. The method of claim 1, further comprising the steps of incrementally adding additional mandrels, where a layer of continuous resin-impregnated filament reinforcement is applied to each said additional mandrel and each previously applied layer of continuous resin-impregnated filament reinforcements.

6. The method of claim 5, where each said layer of continuous resin-impregnated filament reinforcement is applied to each said additional mandrel prior to the curing of each said previously applied layer of continuous resin-impregnated filament reinforcement.

7. An elongated filament wound object comprising a base mandrel having a base end and a tip end, said base mandrel encased in a first layer of continuous resin-impregnated filament reinforcement, a second mandrel having a base end and a tip end, said second mandrel aligned with said encased base mandrel where said base end of said second mandrel abuts said first layer of continuous resin-impregnated filament reinforcement encasing said tip end of said base mandrel, and a second layer of continuous resin-impregnated filament reinforcement encasing said second mandrel, said first layer of continuous resin-impregnated filament reinforcement and said base mandrel.

8. The object of claim 7, said first layer of continuous resin-impregnated filament reinforcement forming a shoulder at said tip end of said base mandrel, said base end of said second mandrel having an outer diameter approximately equal to said shoulder and configured to mate with said shoulder to form a smooth joint therebetween.

9. The object of claim 8, where said base end of said second mandrel is concave.

10. The object of claim 7, further comprising additional mandrels and additional layers of continuous resin-impregnated filament reinforcement, where each additional mandrel is encased in at least one additional layer of continuous resin-impregnated filament reinforcement.

11. The object of claim 7, where said object is a single unitary object with no secondary bonds when cured, formed by adding said second layer of continuous resin-impregnated filament reinforcement prior to the curing of said layer of continuous resin-impregnated filament reinforcement applied to said base mandrel.

* * * * *